United States Patent
Stevenson et al.

(10) Patent No.: US 10,428,950 B2
(45) Date of Patent: Oct. 1, 2019

(54) VALVE PACKING ASSEMBLY HAVING SHAPE-MEMORY MEMBER

(71) Applicant: ATOMIC ENERGY OF CANADA LIMITED / ÉNERGIE ATOMIQUE DU CANADA LIMITÉE, Chalk River (CA)

(72) Inventors: Mathew Stevenson, Pembroke (CA); Fabrice Guerout, Deep River (CA); Rick Boor, Deep River (CA)

(73) Assignee: ATOMIC ENERGY OF CANADA LIMITED / ÉNERGIE ATOMIQUE DU CANADA LIMITÉE, Chalk River (CA)

( * ) Notice: Subject to any disclaimer, the term of this patent is extended or adjusted under 35 U.S.C. 154(b) by 0 days.

(21) Appl. No.: 15/560,514

(22) PCT Filed: Mar. 23, 2016

(86) PCT No.: PCT/CA2016/050332
§ 371 (c)(1),
(2) Date: Sep. 22, 2017

(87) PCT Pub. No.: WO2016/149820
PCT Pub. Date: Sep. 29, 2016

(65) Prior Publication Data
US 2018/0112777 A1    Apr. 26, 2018

Related U.S. Application Data

(60) Provisional application No. 62/136,768, filed on Mar. 23, 2015.

(51) Int. Cl.
*F16J 15/18*    (2006.01)
*F16J 15/16*    (2006.01)
(Continued)

(52) U.S. Cl.
CPC .......... *F16J 15/185* (2013.01); *F16J 15/164* (2013.01); *F16K 3/243* (2013.01); *F16K 41/04* (2013.01)

(58) Field of Classification Search
CPC ............. F16J 15/08; F16J 15/16; F16J 15/185
See application file for complete search history.

(56) References Cited

U.S. PATENT DOCUMENTS 3,582,041 A    6/1971   Priese
4,191,386 A    3/1980   Hershey
(Continued)

FOREIGN PATENT DOCUMENTS

CN    203051810 U    7/2013
WO    2016/149820 A1    9/2016

OTHER PUBLICATIONS

Haines et al., "Artificial Muscles from Fishing Line and Sewing Thread", Science, vol. 343, Feb. 21, 2014.
(Continued)

*Primary Examiner* — Kristina R Fulton
*Assistant Examiner* — L. Susmitha Koneru
(74) *Attorney, Agent, or Firm* — Bereskin & Parr LLP/S.E.N.C.R.L., s.r.l.

(57) ABSTRACT

A packing assembly for a valve includes a first segment having at least one first guiding surface, and a second segment having at least one second guiding surface in engagement with at least a portion of the at least one first guiding surface. A shape-memory member couples the first and second segments. The shape-memory member may be formed of a material that is responsive to changes in temperature, so that, in response to a change in temperature, the shape-memory member may cause relative movement of the first and second segments in a first direction. In response to the movement, the first and second guiding surfaces may
(Continued)

cause relative displacement of the first and second segments in a second direction.

20 Claims, 5 Drawing Sheets

(51) Int. Cl.
*F16K 41/04* (2006.01)
*F16K 3/24* (2006.01)

(56) References Cited

U.S. PATENT DOCUMENTS

| | | | |
|---|---|---|---|
| 4,512,586 A | 4/1985 | Smith | |
| 5,234,194 A | 8/1993 | Smith | |
| 5,368,312 A | 11/1994 | Voit et al. | |
| 5,538,256 A | 7/1996 | Rinne | |
| 5,636,688 A | 6/1997 | Bassinger | |
| 6,354,566 B1 | 3/2002 | Smith et al. | |
| 7,234,533 B2* | 6/2007 | Gambier | E21B 33/1277 166/196 |
| 7,429,028 B2 | 9/2008 | Tanaka et al. | |
| 8,230,555 B2* | 7/2012 | Browne | B65D 63/1027 24/16 PB |
| 8,240,677 B2* | 8/2012 | Browne | B60J 10/50 277/628 |
| 8,360,161 B2* | 1/2013 | Buytaert | E21B 17/1014 166/387 |
| 9,948,054 B2* | 4/2018 | Sato | H01S 3/03 |
| 2002/0074742 A1* | 6/2002 | Quoiani | F16J 15/0806 277/627 |
| 2003/0107183 A1 | 6/2003 | Wilkinson | |
| 2004/0038120 A1* | 2/2004 | Tsai | H01M 12/065 429/66 |
| 2004/0194970 A1* | 10/2004 | Eatwell | E21B 33/1208 166/387 |
| 2007/0164247 A1 | 7/2007 | Yuzawa et al. | |
| 2013/0146155 A1 | 6/2013 | Gilbertson et al. | |
| 2013/0220640 A1* | 8/2013 | Fripp | E21B 33/1208 166/386 |
| 2014/0105527 A1 | 4/2014 | Thoma et al. | |
| 2014/0150879 A1 | 6/2014 | Gilbertson et al. | |

OTHER PUBLICATIONS

Fluid Sealing Association, "What are bolt torque considerations for valve packing that ensure reliable performance?", Pumps & Systems, Part 1, http://www.pumpsandsystems.com/topics/seals/what-are-bolt-torque-considerations-valve-packing-ensure-reliable-performance.
Fluid Sealing Association, "What are the bolt torque considerations for valve packing that ensure reliable performance?", Pumps & Systems, Part 2, http://www.pumpsandsystems.com/topics/seals/what-are-bolt-torque-considerations-valve-packing-ensure-reliable-performance.
"Understanding the Basic Parts of Valve", http://hvac-system-basics.blogspot.ca/2012/08/understanding-basic-parts-of-valve.html, Aug. 31, 2012.
Written Opinion dated Mar. 18, 2016 in respect of International Application No. PCT/CA2016/050332.
International Search Report dated Mar. 18, 2016 in respect of International Application No. PCT/CA2016/050332.
Extended European search report dated Oct. 2, 2018 in respect of European Application No. 16767587.5.

* cited by examiner

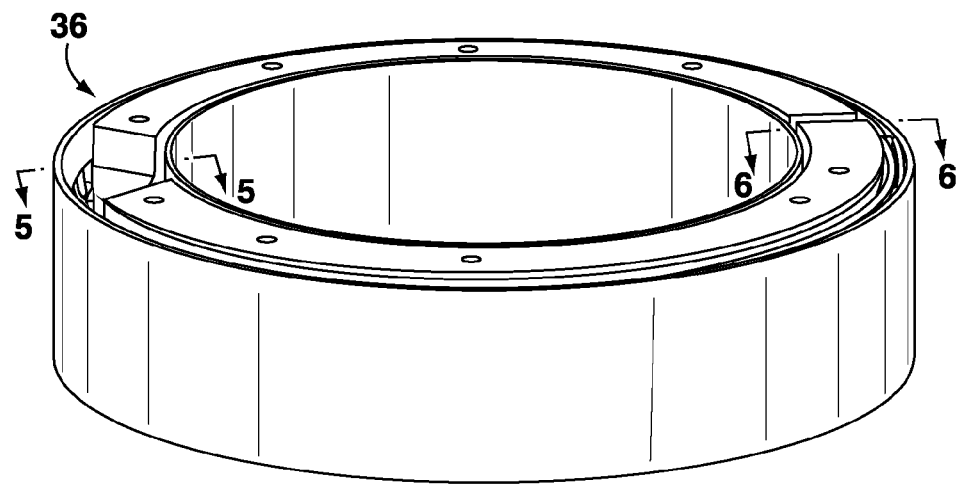
FIG. 4
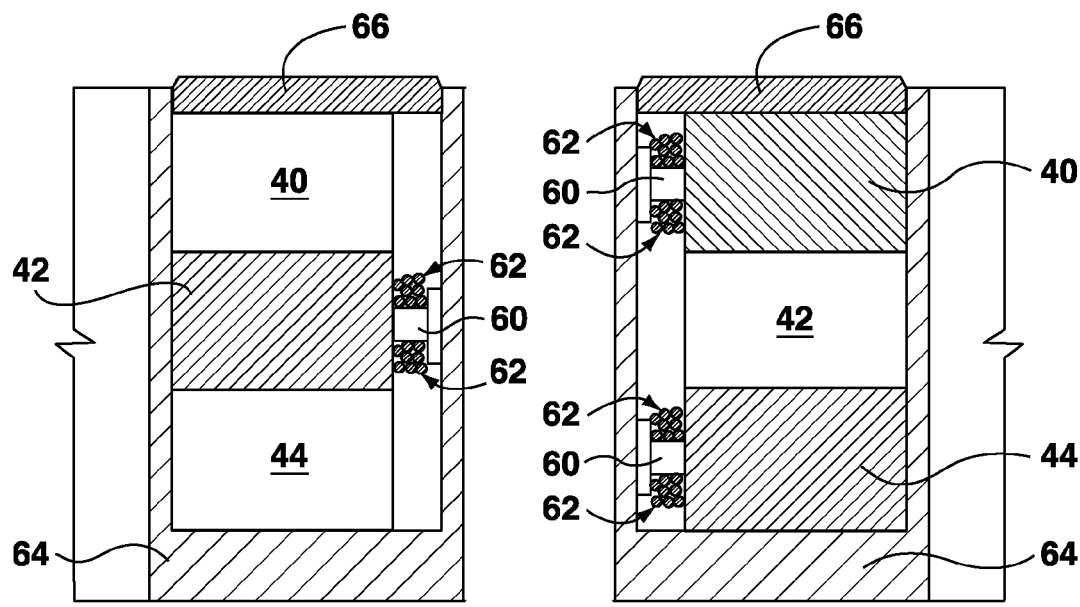
FIG. 5  FIG. 6

VALVE PACKING ASSEMBLY HAVING SHAPE-MEMORY MEMBER

CROSS-REFERENCE TO RELATED APPLICATIONS

This is a national stage application of International Application No. PCT/CA2016/050332 filed on Mar. 23, 2016, which claims priority to U.S. Provisional Application No. 62/136,768 filed on Mar. 23, 2015, and the entire contents of each are hereby incorporated herein by reference.

FIELD

The present disclosure relates generally to valve packing.

BACKGROUND

The following paragraphs are not an admission that anything discussed in them is prior art or part of the knowledge of persons skilled in the art.

U.S. Pat. No. 5,368,312 describes a sealing arrangement for the sealing-off of metallic cylindrical bodies, particularly for shafts in cryogenic valves which are surrounded by an essentially ring-shaped sealing device which cannot be glued to metal. The sealing device is surrounded by a ring which is arranged concentrically with respect to the shaft, consists of a metal alloy with shape memory characteristics and with a one-way characteristic and the interior shape of which is adapted to the exterior shape of the sealing device and which contracts when the transition temperature is exceeded.

U.S. Pat. No. 6,354,566 describes live loaded valve stem packing wherein grafoil packing is molded into a metal cap that prevents extrusion of the packing, and has live loading built into the metal cap. This metal cap may be conventional flat spring materials or a shape memory alloy. The cap is designed with a singular hump, entirely along its top surface. On this hump there are two slots through the hump, 180 degrees apart, for ease of removing the packing. Upon assembly of the packing box, the hump is elastically flattened out due to axial loading through the fasteners. As the packing consolidates during service the hump deflects to maintain a relatively constant or enhanced axial load on the packing to enhance sealing, even during a fire.

United States Publication No. US 2014/0150879 describes a valve actuator, valve, and method of actuation of a valve. The valve actuator includes a shape memory alloy element attachable to a valve body, capable of use with a valve to cause movement of the valve between first and second positions at a predetermined temperature and responsive to at least a threshold amount of temperature change of the shape memory alloy element. The valve actuator further includes an expansion element attached to the shape memory alloy element, the expansion element responsive to temperature changes at a rate lower than a rate of change of temperature indicative of a valve leak, the expansion element adjusting tension on the shape memory alloy element, thereby changing the predetermined temperature.

INTRODUCTION

The following is intended to introduce the reader to the detailed description that follows and not to define or limit the claimed subject matter.

In an aspect of the present disclosure, a packing assembly may include: a first segment including at least one first guiding surface; a second segment including at least one second guiding surface in engagement with at least a portion of the at least one first guiding surface; and a shape-memory member coupling the first and second segments. The shape-memory member may be formed of a material that is responsive to changes in temperature, so that, in response to a change in temperature i) the shape-memory member causes relative movement of the first and second segments in a first direction, and ii) in response to the movement, the first and second guiding surfaces cause relative displacement of the first and second segments in a second direction.

In an aspect of the present disclosure, an apparatus may include: an annular top segment spaced about an axis, the top segment including an upper face and a plurality of first inclined surfaces; an annular bottom segment spaced about the axis, the bottom segment including a lower face and a plurality of second inclined surfaces; an annular center segment spaced about the axis and arranged between the top and bottom segments, the center segment including complementary surfaces in engagement with the first and second inclined surfaces; and a shape-memory element coupling the top, bottom and center segments. The shape-memory element may be formed of a material that is responsive to changes in temperature, so that, in response to an increase in temperature i) the shape-memory element causes rotational movement of the center segment about the axis relative to the top and bottom segments, and ii) in response to the rotational movement, the first and second inclined surfaces cause relative displacement of the top and bottom segments parallel to the axis so that a dimension between the upper and lower faces increases.

In an aspect of the present disclosure, a valve may include: a stem extending lengthwise and defining an axis; a bonnet surrounding the stem about the axis; at least one packing ring arranged between the stem and the bonnet, the at least one packing ring having a first radial surface and a second radial surface; a gland follower arranged to transfer compressive load to the first radial surface of the at least one packing ring; and a first packing assembly including a first annular segment including at least one first guiding surface, a second annular segment including at least one second guiding surface in engagement with the at least one first guiding surface, and a shape-memory member coupling the first and second segments. The shape-memory member may be formed of a material that is responsive to changes in temperature, so that, in response to an increase in temperature i) the shape-memory member causes relative rotational movement of the first and second segments about the axis, and ii) in response to the rotational movement, the first and second guiding surfaces cause relative displacement of the first and second segments in a direction parallel to the axis to transfer compressive load to the second radial surface of the at least one packing ring.

In an aspect of the present disclosure, an apparatus may include: a first segment including at least one first guiding surface; a second segment including at least one second guiding surface in engagement with at least a portion of the at least one first guiding surface; and a drive member coupling the first and second segments, the drive member being responsive to an external stimulus to cause relative movement between the first and second segments in a first direction, and, in response to the movement, the first and second guiding surfaces cause relative displacement of the first and second segments in a second direction.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings:

FIG. 4 is a perspective view of the segments and the shape-memory member assembled in the guide sleeve to form a packing assembly;

FIGS. 5 and 6 are sectional views along lines 5-5 and 6-6 of FIG. 4;

DETAILED DESCRIPTION

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

Reducing fugitive emissions from valves will result in health, environmental and economic benefits. Valves are used in nearly every industry and reducing fugitive emissions from valves is a priority for the sake of public health and environmental protection. Valves control the flow of fluids in applications ranging from agricultural irrigation to power production. Most valves have a dynamic seal surrounding a moving valve stem that is prone to leakage, resulting in fugitive emissions. As health and environmental protection regulations become more stringent, the valve industry must continually improve valve sealing performance.

Figure 1:
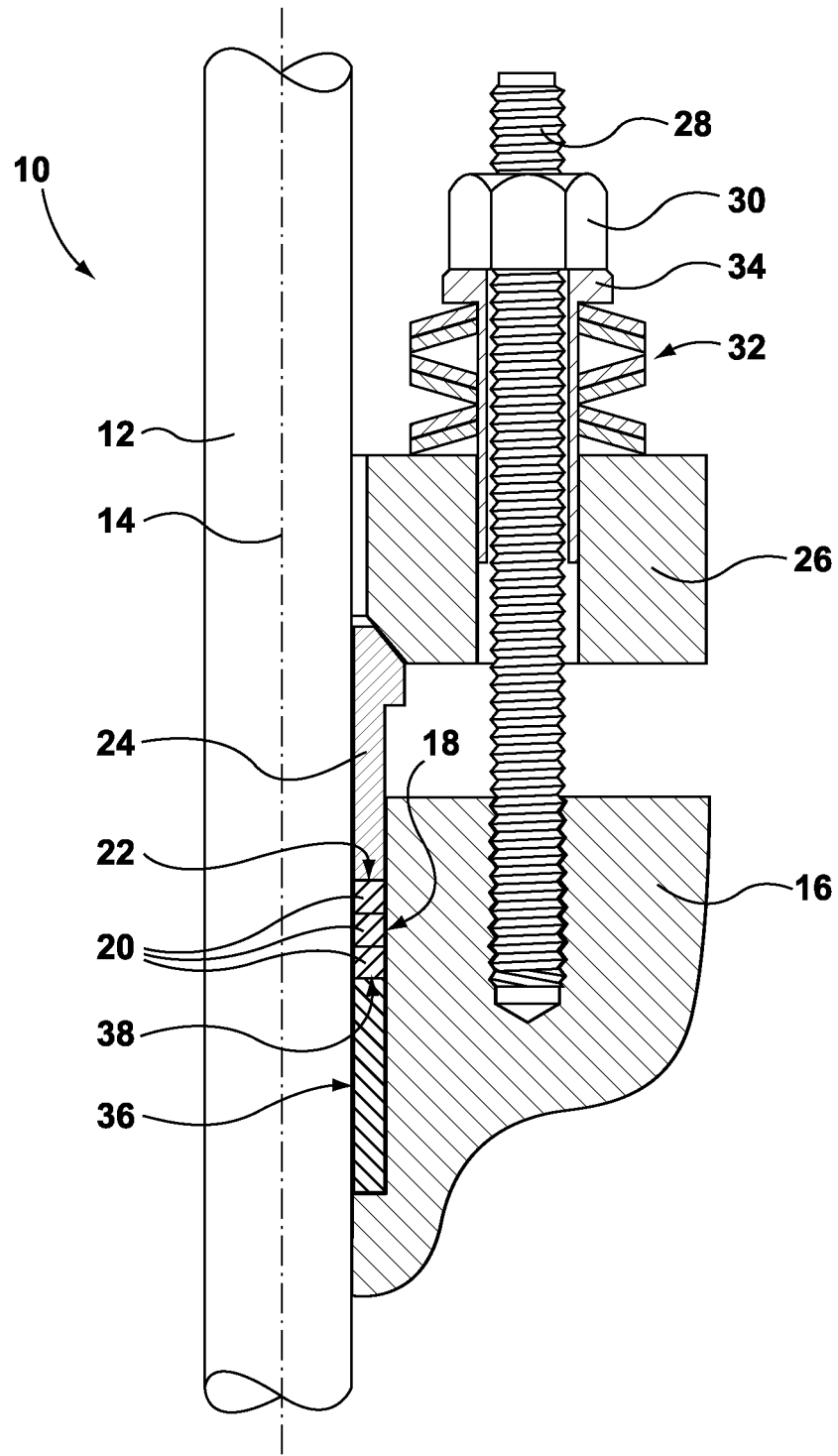
FIG. 1 is a cross sectional, schematic view of portions of a valve.

To provide context for the problem of valve stem sealing and the proposed solution, a brief review of valve components is now provided. Referring to FIG. 1, portions of an example of a valve are shown generally at reference numeral 10. The valve 10 may form part of a gate valve, which is a representative example of a device that controls the flow of a fluid. However, the components in the vicinity of the seal are similar for most types of valves, and therefore the present disclosure is relevant to other valve types.

The valve 10 includes a stem 12 that extends lengthwise and defines an axis 14. A cover or bonnet 16 surrounds the stem 12 about the axis 14, and a seal is required to prevent fluid from escaping between the stem 12 and the bonnet 16. A chamber 18 in the bonnet 16, which may be referred to as the stuffing box, contains at least one packing ring 20. The packing rings 20 are typically made of compliant material, which seal the annular space between the stem 12 and an inner wall of the chamber 18. Braided graphite and braided polytetrafluoroethylene (PTFE) are exemplary materials that may be used for the packing rings 20.

The packing rings 20 must be compressed axially so that they expand radially to seal against the stem 12 and the inner wall of the chamber 18. In the example illustrated, an axial compression force is applied to a first radial surface 22 at the top of the stack of packing rings 20 by a gland follower 24. A gland plate 26 bears against the gland follower 24, and a threaded stud 28 extends through the gland plate and is secured to the bonnet 16. A nut 30 is installed on the stud 28 and is torqued to apply a desired force to the gland follower 24.

There are problems with existing methods of compressing the packing rings 20. For example, due to friction, the packing rings 20 toward the bottom of the stack may not be compressed as much as the packing rings 20 toward the top of the stack. This non-uniform compression may reduce the sealing performance.

Furthermore, an initial axial force is typically applied when the valve 10 is cold. When the valve 10 is put into service at high temperatures, there may be a drop in axial force. This may result in leakage through the packing set. One solution to this problem is "hot torqueing", i.e. re-tightening the bolts while the valve is live. This extra maintenance may be undesirable from a plant operations point of view.

Live loading with Belleville spring washers is a way to compensate for a drop in axial force due to packing consolidation. Referring to FIG. 1, Belleville spring washers 32 may be installed between a bushing 34 and the gland plate 26. However, live loading with the Belleville spring washers 32 may not solve the problem of non-uniform compression in the stack of the packing rings 20, because the force is still applied from the top only. Moreover, it may not be desirable to use live loading in all valves because of the added cost associated therewith.

In addition to the issue of force distribution in the stack of the packing rings 20, consolidation of the packing material may also lead to leakage. When the packing rings 20 are first installed, there may be air gaps between the packing rings 20 and potentially voids in the packing rings 20 themselves. As the stack of the packing rings 20 is compressed by the gland follower 24, these voids may be eliminated. Most of this migration of material may occur during the initial tightening of the nut 30. However, once the valve 10 is in service, large temperature changes and repeated movement of the stem 12 may cause further material migration. This may result in an overall decrease in the size of the stack of the packing rings 20, which is referred to as consolidation. Consolidation may cause the axial force applied to the packing rings 20 to decrease and the corresponding decrease in radial force leads to leakage.

The problems of leakage and the underlying causes described above makes it desirable for a solution that works with existing valves, is simple for maintenance personnel to install, evenly distributes the force in the packing stack and compensates for the decrease in packing loading that occurs when the valve is put into service at high temperature.

With continued reference to FIG. 1, the present disclosure relates to a packing assembly shown generally at reference numeral 36. The packing assembly 36 applies a compressive force to a second radial surface 38 at the bottom of the stack of the packing rings 20. The packing assembly 36 may compensate for the force loss due to consolidation, and may equalize the force distribution in the stack of the packing rings. As described herein, the packing assembly 36 may be passive, actuated by the thermal energy in the fluid passing through the valve 10.

Figure 2:
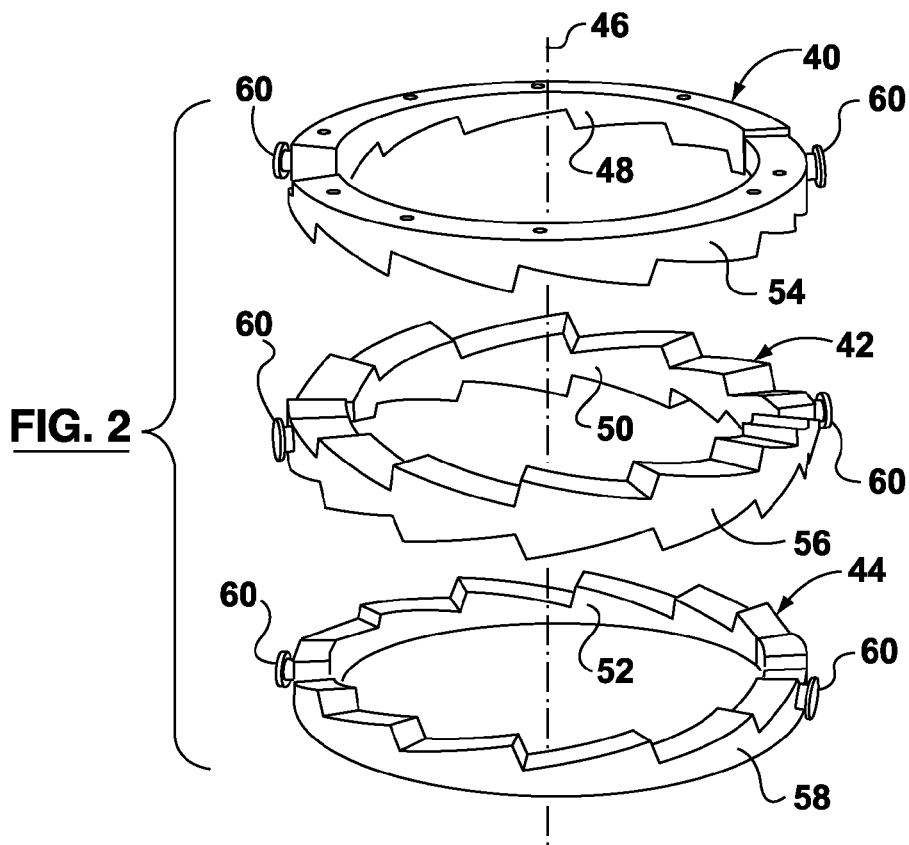
FIG. 2 is an exploded, perspective view of segments.
Figure 3:
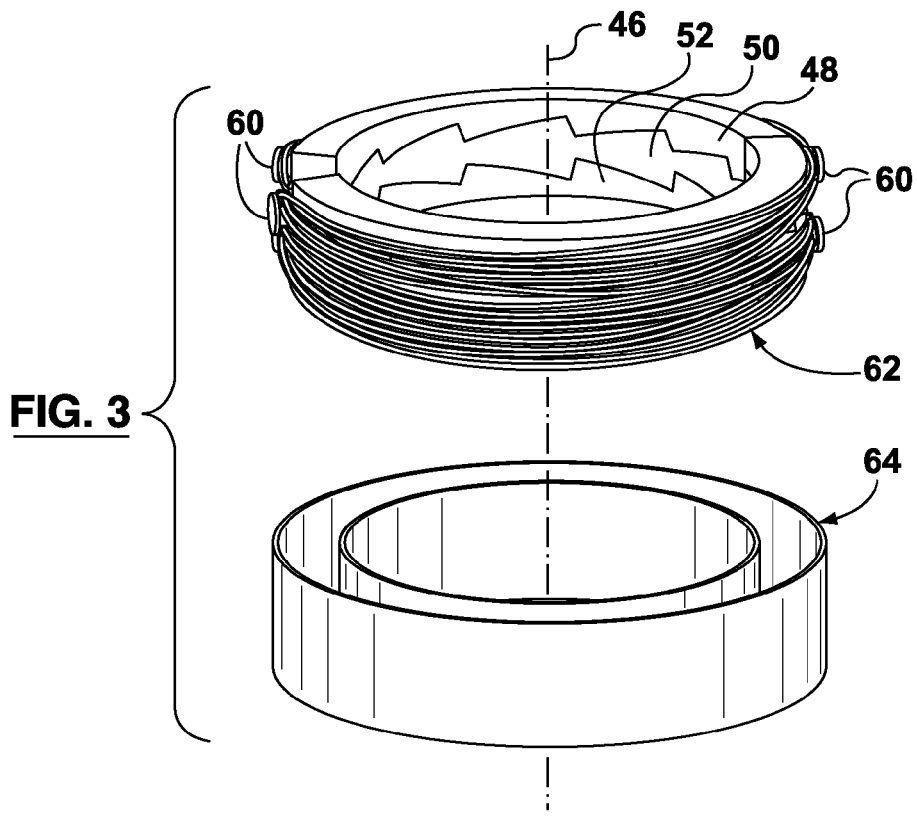
FIG. 3 is an exploded, perspective view of the segments, a shape-memory member and a guide sleeve.

Referring to FIGS. 2 and 3, annular top, center and bottom segments 40, 42, 44 are spaced about an axis 46 (which upon installation may be collinear with the axis 14 shown in FIG. 1). Each of the segments 40, 42, 44 includes an interior side 48, 50, 52, respectively, and an exterior side 54, 56, 58, respectively. Pins 60 are mounted to the exterior sides 54, 56, 58 of each of the segments 40, 42, 44. A shape-memory member 62 in the form of wire is shown connected to the pins 60 to couple the segments 40, 42, 44. The pins 60 each have a head that is a larger diameter than the rest of the pin 60 to prevent the shape-memory member 62 from slipping off. The head of the pin 60 of the center segment 42 may be elongated vertically in order to hold twice as many wraps of wire as the pins 60 of the top and bottom segments, 40, 44. The segments 40, 42, 44 and the shape-memory member 62 are inserted into a guide sleeve 64.

In some examples, each of the segments 40, 42, 44 may include vertically-extending holes that are aligned when wrapping the wire. Dowel pins (not shown) may be placed in the holes to keep the segments 40, 42, 44 aligned when wrapping the wire. The dowel pins may be removed after the segments 40, 42, 44 are inserted into the guide sleeve 64. Alternatively, low strength shear pins (not shown) may be placed in the holes and left in place. The pins may be configured to break once the wire is thermally actuated so that segments 40, 42, 44 may move freely.

In the example illustrated, each of segments 40, 42, 44 is formed into two subsegment halves, which may simplify installation to the valve 10 (FIG. 1). However, in other examples, each of segments 40, 42, 44 may be formed in one piece. Furthermore, each of the subsegment halves is shown having a circumference that is less than 180° (e.g., 165°), so that gaps are present between radial end faces. These gaps allow for relative rotational movement of the segments 40, 42, 44 about the axis 46. Although not shown, the guide sleeve 64 may also be formed into two halves to simplify installation.

In some examples, during thermal actuation, only the center segment 42 rotates while the top and bottom segments 40, 44 may be stationary. In such examples, the gaps between the subsegment halves of the top and bottom segments 40, 44 may be reduced to the point where there is a very small gap just to make installation easier.

FIGS. 4, 5 and 6 show segments 40, 42, 44 and the shape-memory member 62 retained by the guide sleeve 64 to form the packing assembly 36. The guide sleeve 64 is sized to have a locating fit in the annular space between the stem 12 and the inner wall of the chamber 18 (FIG. 1). The guide sleeve 64 may protect components of the valve 10 and may assist the segments 40, 42, 44 in rotational movement about the axis 46. Optionally, as shown in FIGS. 5 and 6, the packing assembly 36 may include a washer plate 66, which may promote uniformity of the compressive load about the axis 46 by providing support above any gap in the top segment 40.

The shape-memory member is a drive member responsive to an external stimulus, and may, in some examples, be formed of a material that is responsive to temperature change, including, for example but without limitation, a shape-memory alloy such as copper-aluminium-nickel shape-memory alloy or a nickel-titanium shape-memory alloy. These materials change shape (e.g., contract) when the temperature is increased above the alloy's transformation temperature. For single actuation cycle applications like the packing assembly 36 described herein, it may be desirable to prestress the shape-memory before installing it in the packing assembly 36. It is possible that other materials may be used for the shape-memory member 62, including, for example but without limitation, thermally-actuated twisted polymers.

In the example illustrated, the shape-memory member 62 is shown in the form of wire looped around the pins 60. In response to a change in temperature, a length dimension of the shape-memory member 62 changes, and a tensile stress in the shape-memory member 62 is converted into a compressive force output. In the example illustrated, the segments 40, 42, 44 are stacked together, the pins 60 in the segments 40, 44 are aligned one above the other, whereas the pins 60 of the segment 42 are at the corresponding opposite ends of the subsegment halves. The shape-memory member 62 is looped around the pins 60 in a repeating sequence of: pin 60 in the segment 40, pin 60 in the segment 42, generally diametrically opposite pin 60 in the segment 44, generally diametrically opposite pin 60 in the segment 42, etc. Free ends of the shape-memory member 62 may be secured by metal crimps (not shown), and/or an adhesive (not shown) such as a two-part epoxy.

Figure 7:
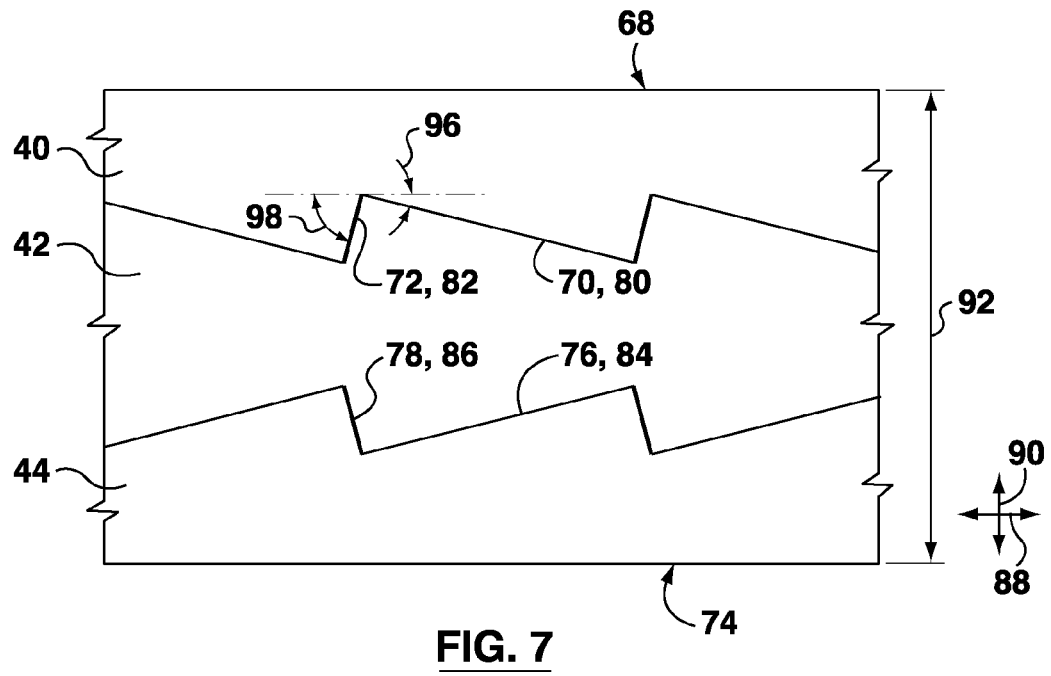
FIGS. 7 and 8 are schematic views showing the segments in first and second positions, respectively.
Figure 8:
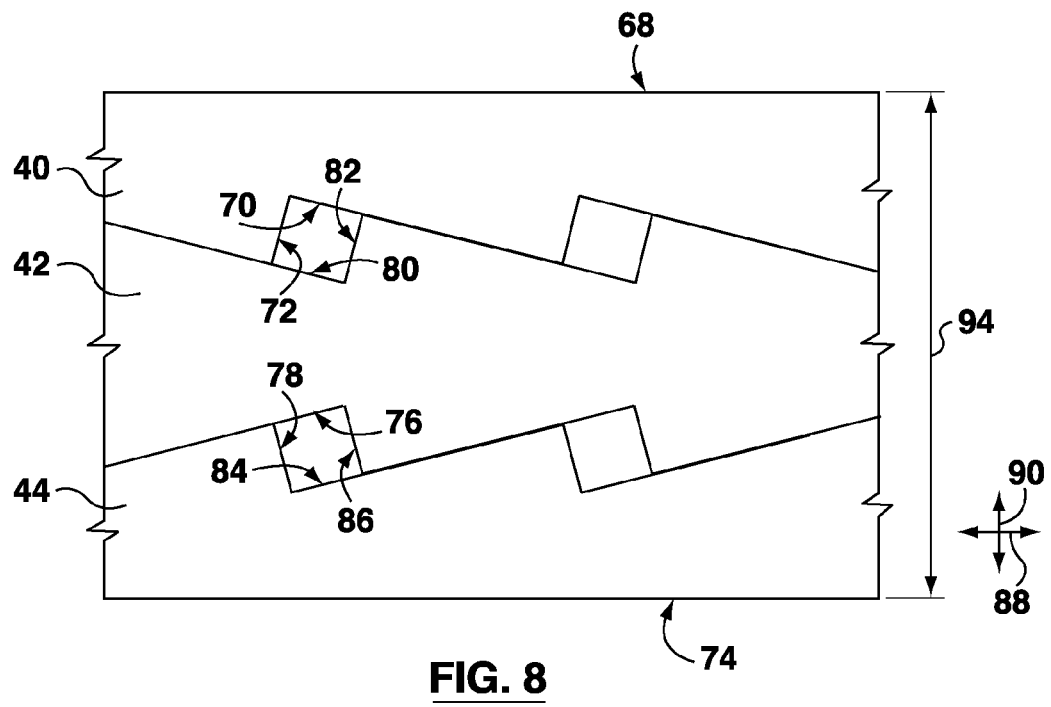

Referring to FIGS. 7 and 8, the top segment 40 includes an upper face 68, a plurality of guiding or inclined surfaces 70, and a plurality of stop surfaces 72. The bottom segment 44 includes a lower face 74, a plurality of guiding or inclined surfaces 76, and a plurality of stop surfaces 78. The center segment 42 includes a plurality of guiding or inclined surfaces 80 and a plurality of stop surfaces 82, which are complementary to the surfaces 70, 72, respectively. The center segment 42 further includes a plurality of guiding or inclined surfaces 84 and a plurality of stop surfaces 86, which are complementary to the surfaces 76, 78, respectively.

In the example illustrated, the surface 70 engages and slidingly mates with the surface 80, the surface 76 engages and slidingly mates with the surface 84. Furthermore, each of the surfaces 70, 72, 76, 78, 80, 82, 84, 86 has a helical shape. In other words, each of the surfaces 70, 72, 76, 78, 80, 82, 84, 86 may be generally linear. In other examples, other shapes and configurations may be implemented, including, for example but without limitation, curved shapes. Moreover, in other examples, intermediary structures may be present between the segments 40, 42, 44. For example, rollers or bearings (not shown) may be included between the inclined surfaces 70, 80 and the inclined surfaces 76, 84 to reduce friction therebetween.

In response to an increase in temperature, the shape-memory member causes relative rotational movement of the center segment 42 in a radial direction 88 relative to the top and bottom segments 40, 44. In response to the rotational movement, the inclined surfaces 70, 80 and the inclined surfaces 76, 84 slide relative to one another and cause relative displacement of the top and bottom segments 40, 44 in an axial direction 90 so that a dimension 92 in a first position (FIG. 7) between the upper and lower faces 68, 74 increases to a dimension 94 in a second position (FIG. 8).

In the example illustrated, there are three of the segments 40, 42, 44, each of the segments 40, 42, 44 is formed of two subsegment halves, and each subsegment includes 8 of the helical surfaces. This configuration may be varied and should be understood as being merely illustrative. Having a greater number of segments will increase the overall displacement of the packing assembly. Furthermore, the angles of the helical surfaces may be varied to adjust the displacement. For example and without limitation, referring to FIG. 7, an angle 96 between the surfaces 70, 80 and the radial direction 88 may be between about 8° and 15°, and an angle 98 between the surfaces 72, 82 and the radial direction 88 may be between about 75° and 82°. Moreover, the dimensions and arrangement of the shape-memory member 62 may be varied to obtain a desired displacement over a range of operating temperatures. Various configurations are possible.

In use, referring again to FIG. 1, two identical halves of the packing assembly 36, each including the three subsegments and the half guide sleeve are placed in the bottom of the chamber 18 before the packing rings 20 are installed. The packing rings 20 may be installed according to standard industry practices; no additional requirements may be introduced by using the packing assembly 36. When the valve 10 is put into service, heat transfer from fluid passing through the valve 10 causes the shape-memory member to decrease in length. As the shape-memory member shrinks, a tensile force is generated that pulls the pins in the segments closer together. Due to the angle of the inclined surfaces, the top and bottom segments are forced to spread apart. The final result is an increase in the height of the packing assembly 36. As the height increases, the packing assembly 36 compresses the packing rings 20 above it.

Figure 9:
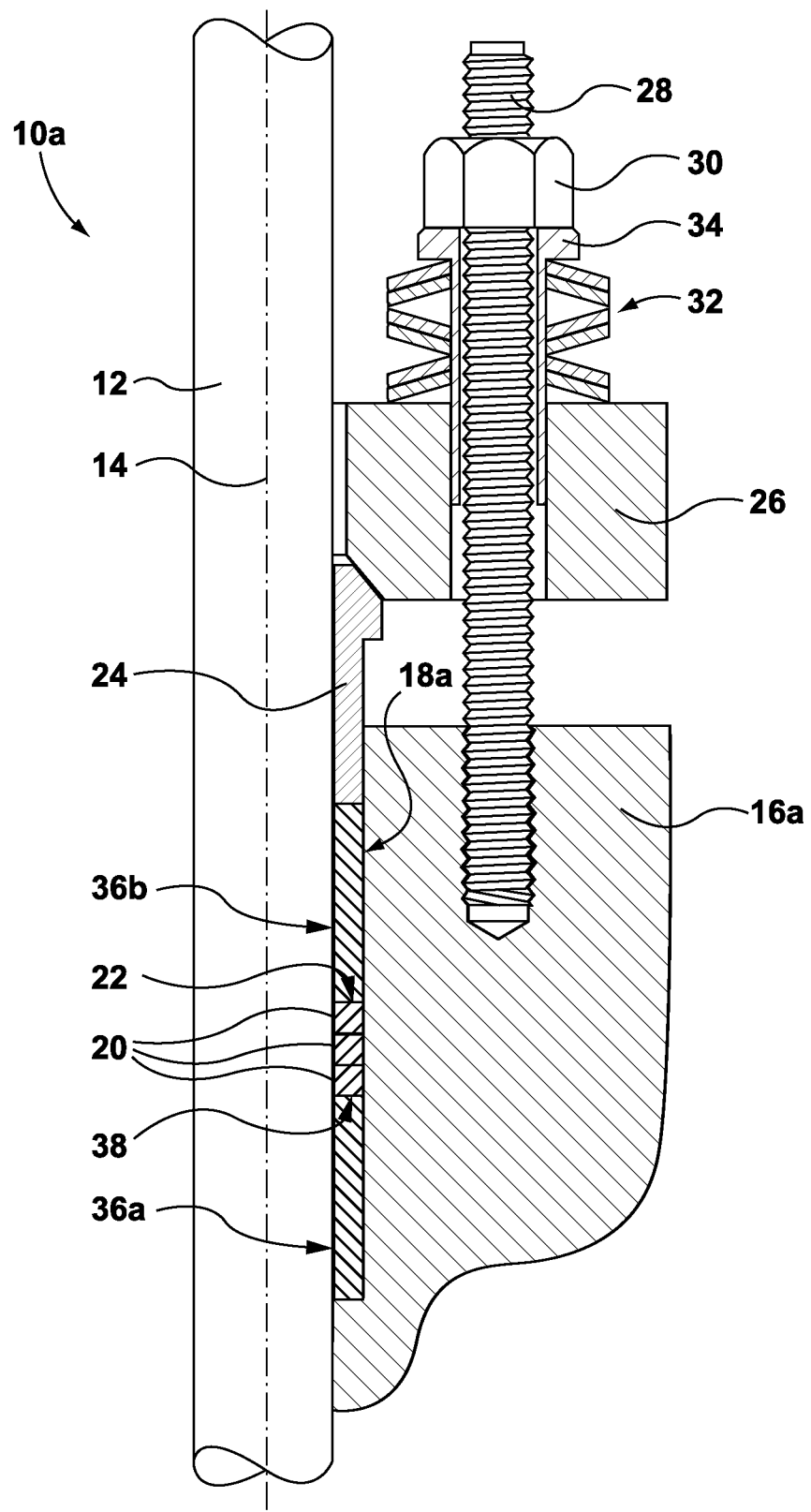
FIG. 9 is a cross sectional, schematic view of portions of another valve.

Referring to FIG. 9, portions of another example of a valve are shown generally at reference numeral 10a. A cover or bonnet 16a surrounds the stem 12 about the axis 14, and a seal is required to prevent fluid from escaping between the stem 12 and the bonnet 16a. An elongated chamber 18a in the bonnet 16a contains the packing rings 20, which seal the annular space between the stem 12 and an inner wall of the chamber 18a.

In the example illustrated, the valve 10a includes packing assemblies 36a, 36b. The packing assembly 36a applies a compressive force to the second radial surface 38 at the bottom of the stack of the packing rings 20. The packing assembly 36b is arranged between the gland follower 24 and the packing rings 20, and applies a compressive force to the first radial surface 22 at the top of the stack of the packing rings 20. With this configuration, due to the contribution of the packing assembly 36b, the gland follower 24 may be required to apply less axial compression force to the first radial surface 22 to achieve satisfactory sealing performance, and thus less torque on the nut 30 may be needed. However, in use, it should be appreciated that the packing assembly 36b may be subjected to less of an increase in temperature as compared to the packing assembly 36a, and accordingly the design of the packing assemblies 36a, 36b may need to account for this difference.

The present disclosure has commercial applications wherever valves are used at elevated temperatures, e.g., above 70° C. Example applications may include, without limitation, nuclear power generation, chemical processing, oil and gas, and mining.

While the above description provides examples of one or more apparatuses or methods, it will be appreciated that other apparatuses or methods may be within the scope of the accompanying claims.

We claim:

1. A packing assembly, comprising:
    a first segment comprising at least one first guiding surface;
    a second segment comprising at least one second guiding surface in engagement with at least a portion of the at least one first guiding surface; and
    a shape-memory member coupling the first and second segments, the shape-memory member being formed of a material that is responsive to changes in temperature, so that, in response to a change in temperature
    i) the shape-memory member causes relative movement of the first and second segments in a first direction, and
    ii) in response to the movement, the first and second guiding surfaces cause relative displacement of the first and second segments in a second direction,
    wherein the shape-memory member is formed of a shape-memory alloy.

2. The packing assembly of claim 1, wherein the shape-memory member is formed of a copper-aluminium-nickel shape-memory alloy or a nickel-titanium shape-memory alloy.

3. The packing assembly of claim 1, wherein the shape-memory member comprises a wire formed of the shape-memory alloy.

4. The packing assembly of claim 3, wherein the wire is looped between pins mounted on the first and second segments.

5. The packing assembly of claim 4, wherein the pins are mounted on exterior surfaces of the first and second segments.

6. The packing assembly of claim 1, wherein the second segment comprises at least one third guiding surface, and further comprising a third segment comprising at least one fourth guiding surface in engagement with the at least one third guiding surface.

7. The packing assembly of claim 6, wherein the shape-memory member causes movement of the second segment relative to the first and third segments, and the guiding surfaces cause relative displacement of the first and third segments so that a dimension between respective upper and lower faces of the first and third segments increases.

8. The packing assembly of claim 1, further comprising a guide sleeve for retaining the segments and the shape-memory member.

9. The packing assembly of claim 1, wherein the shape-memory member causes relative rotational movement of the first and second segments about an axis.

10. The packing assembly of claim 9, wherein the first and second guiding surfaces cause relative displacement of the first and second segments in the second direction parallel to the axis.

11. The packing assembly of claim 10, wherein each of the first and second segments have a generally annular shape spaced about the axis, and, in response to an increase in temperature, the first and second segments are displaced apart in the second direction.

12. The packing assembly of claim 11, wherein each of the first and second segments is formed of two or more subsegments.

13. The packing assembly of claim 11, wherein the first segment comprises a plurality of first guiding surfaces spaced apart about the axis, and the second segment comprises a plurality of second guiding surfaces spaced apart about the axis in engagement with the plurality of first guiding surfaces.

14. The packing assembly of claim 13, wherein each of the plurality of first guiding surfaces comprises an inclined surface, and each of the plurality of second guiding surfaces comprises a complementary inclined surface that slidingly mates with the respective inclined surface of the plurality of first guiding surfaces.

15. The packing assembly of claim 14, wherein each of the inclined surfaces has a helical shape.

16. An apparatus, comprising:
   an annular top segment spaced about an axis, the top segment comprising an upper face and a plurality of first inclined surfaces;
   an annular bottom segment spaced about the axis, the bottom segment comprising a lower face and a plurality of second inclined surfaces;
   an annular center segment spaced about the axis and arranged between the top and bottom segments, the center segment comprising complementary surfaces in engagement with the first and second inclined surfaces; and
   a shape-memory element coupling the top, bottom and center segments, the shape-memory element being formed of a material that is responsive to changes in temperature, so that, in response to an increase in temperature
   i) the shape-memory element causes rotational movement of the center segment about the axis relative to the top and bottom segments, and
   ii) in response to the rotational movement, the first and second inclined surfaces cause relative displacement of the top and bottom segments parallel to the axis so that a dimension between the upper and lower faces increases.

17. An apparatus for valve packing, comprising:
   a first segment comprising at least one first guiding surface;
   a second segment comprising at least one second guiding surface in engagement with at least a portion of the at least one first guiding surface; and
   a shape-memory member coupling the first and second segments, the shape-memory member being formed of a material that is responsive to changes in temperature, so that, in response to a change in temperature
   i) the shape-memory member causes relative movement of the first and second segments in a first direction, and
   ii) in response to the movement, the first and second guiding surfaces cause relative displacement of the first and second segments in a second direction,
   wherein the second segment comprises at least one third guiding surface, and further comprising a third segment comprising at least one fourth guiding surface in engagement with the at least one third guiding surface.

18. The apparatus of claim 17, wherein the shape-memory member causes movement of the second segment relative to the first and third segments, and the guiding surfaces cause relative displacement of the first and third segments so that a dimension between respective upper and lower faces of the first and third segments increases.

19. The apparatus of claim 18, wherein the shape-memory member is formed of a shape-memory alloy.

20. The apparatus of claim 19, wherein the shape-memory member comprises a wire formed of the shape-memory alloy.

* * * * *